US010280516B2

(12) United States Patent
Chan et al.

(10) Patent No.: US 10,280,516 B2
(45) Date of Patent: May 7, 2019

(54) ENCAPSULATION OF A STIFFENER LAYER IN ALUMINUM

(71) Applicant: Apple Inc., Cupertino, CA (US)

(72) Inventors: Collin D. Chan, Dublin, CA (US); Matthew W. Crowley, San Francisco, CA (US); Jude Mary Runge, Chicago, IL (US)

(73) Assignee: Apple Inc., Cupertino, CA (US)

( * ) Notice: Subject to any disclaimer, the term of this patent is extended or adjusted under 35 U.S.C. 154(b) by 653 days.

(21) Appl. No.: 14/280,462

(22) Filed: May 16, 2014

(65) Prior Publication Data

US 2015/0125636 A1    May 7, 2015

Related U.S. Application Data

(60) Provisional application No. 61/901,221, filed on Nov. 7, 2013.

(51) Int. Cl.
| | |
|---|---|
| *H05K 5/04* | (2006.01) |
| *C23C 24/04* | (2006.01) |
| *C25D 11/04* | (2006.01) |
| *C25D 11/02* | (2006.01) |

(52) U.S. Cl.
CPC ............ *C23C 24/04* (2013.01); *C25D 11/022* (2013.01); *C25D 11/04* (2013.01); *Y10T 428/13* (2015.01); *Y10T 428/2495* (2015.01); *Y10T 428/24331* (2015.01); *Y10T 428/30* (2015.01)

(58) Field of Classification Search
CPC ...... A47G 25/26; A47G 25/30; Y10T 428/13; Y10T 428/24331; Y10T 428/2495; Y10T 428/24997; Y10T 428/30; C25D 11/02; C25D 11/022; C25D 11/04; C25D 11/06; C25D 11/20; C25D 11/243; C25D 11/246; C25D 11/26; C25D 11/30; C25D 11/34; C23C 24/04; C09D 5/24; C09D 5/4476

See application file for complete search history.

(56) References Cited

U.S. PATENT DOCUMENTS

| | | | | |
|---|---|---|---|---|
| 4,954,387 | A * | 9/1990 | Sikorski | B29C 37/0085 428/138 |
| 5,402,004 | A * | 3/1995 | Ozmat | H01L 23/147 257/717 |
| 2003/0066672 | A1* | 4/2003 | Watchko | C23C 4/00 174/50 |
| 2010/0143650 | A1* | 6/2010 | Tsai | B29C 66/304 428/139 |

(Continued)

*Primary Examiner* — Yan Lan (74) *Attorney, Agent, or Firm* — Polsinelli PC (57) ABSTRACT

The described embodiments relate to methods and apparatus for increasing rigidity of a metal housing while maintaining or reducing a wall thickness of the metal housing. More particularly a method for embedding a stiffener layer within an aluminum substrate is discussed. In one exemplary embodiment the stiffener layer can be a carbon fiber sheet applied to an inside surface of an unfinished housing and then subsequently covered by depositing a layer of aluminum over the carbon fiber in a solid-state deposition process. The deposited aluminum can adhere to the unfinished housing around or through the carbon fiber layer to bond with the unfinished housing. Deposition parameters can be controlled to prevent damage to the carbon fiber sheet.

12 Claims, 7 Drawing Sheets

(56) References Cited

U.S. PATENT DOCUMENTS

2011/0155452 A1\* 6/2011 Liu ................... B29C 45/0053
174/535
2012/0250250 A1\* 10/2012 Tatebe ................. G06F 1/1656
361/679.55

\* cited by examiner

ENCAPSULATION OF A STIFFENER LAYER IN ALUMINUM

CROSS-REFERENCE TO RELATED APPLICATIONS

The present application claims the benefit of U.S. Provisional Application No. 61/901,221, entitled "ENCAPSULATION OF A STIFFENER LAYER IN ALUMINUM" filed Nov. 7, 2013, the content of which is incorporated herein by reference in its entirety for all purposes.

FIELD

The described embodiments relate generally to reducing a weight of a device housing without adversely affecting its structural integrity. More specifically a method for embedding a stiffening layer within a metal substrate is disclosed.

BACKGROUND

As makers of electronic devices attempt to continually make devices increasingly smaller, innovative ways of reducing the weight of devices has become progressively more difficult to achieve. For example, while the overall weight of a device enclosure can be reduced by commensurably reducing the thickness of device enclosure walls, the reduction in wall thickness can reduce the ability of the enclosure to withstand normal handling. Accordingly, the walls will require a certain minimum wall thickness or rigidity to maintain a minimum structural integrity of the enclosure.

SUMMARY

This paper describes various embodiments that relate to reducing the weight of a device housing without adversely affecting the structural integrity of the device housing. In one embodiment, an apparatus is set forth as having a metal substrate and a stiffener layer made of carbon fiber that abuts the metal substrate. Additionally, the apparatus includes a cold sprayed layer, wherein the cold sprayed layer and metal substrate encapsulate the stiffener layer.

In another embodiment, a computing device housing is set forth. The computing device housing can include an aluminum substrate comprising a recess. Further, the computing device housing can include a stiffener layer made of carbon fiber residing within the recess of the aluminum substrate. Additionally, the computing device housing can include a cold sprayed layer residing within the recess of the aluminum substrate, wherein the aluminum substrate and cold sprayed layer completely encapsulate the stiffener layer.

In yet another embodiment, a method is set forth for encapsulating a stiffener layer within an aluminum substrate of a device housing to improve rigidity of the device housing. The method can include a step of applying the stiffener layer against a first surface of the aluminum substrate. The method can further include a step of depositing a layer of material over the stiffener layer such that the aluminum substrate and the layer of material cooperate to encapsulate the stiffener layer. Additionally, the method can include machining material away from a second surface of the aluminum substrate that opposes the first surface of the aluminum substrate. In this way, the stiffener layer can reinforce the second surface of the aluminum substrate during the machining operation.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings in which.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Thin-walled metal housings of computing devices can be susceptible to denting and can in certain cases show machining artifacts where housing walls are cut overly thin. Structural weakness of this sort can cause undesirable blemishes to appear on an outside surface of the computing device and in severe cases can cause internal damage to components within the housing. One way to alleviate such concerns is to add a stiffening layer to the housing. Unfortunately, stiffening layers can cause other problems such as additional fabrication complexities, and in some cases problems with finishing processes. In housings made of solid aluminum, conventional anodization produces predictable results; however, if an internal stiffening layer such as carbon fiber is exposed to the chemical bath used to create an anodization layer, the chemicals can have an adverse reaction with the stiffener layer, that can contaminate the bath and/or reduce structural integrity of the internal stiffening layer. One way to eliminate these kinds of surface treatment problems is to embed the stiffener layer within the metal housing.

The stiffener layer can be embedded within the metal housing (e.g., aluminum) by utilizing a solid-state deposition process, such as cold spray. Cold spraying involves accelerating and cooling small metal particles that plastically deform against a substrate to form a metal layer. Since finishing processes can be applied to the formed metal layer created by a cold spray process, the stiffener layer can be applied along an outside or inside surface of the enclosure to abut the surface, and then be subsequently covered by cold spray to match a look and feel of the enclosure. A material makeup of the cold spray can be adjusted to match a cosmetic look of the housing. When the stiffener layer is lighter and/or stronger than the metal to which it is affixed, a wall thickness of the enclosure can be reduced and/or strengthened. It should be noted that many forms of physical vapor deposition are also compatible with the disclosed embodiments. For example, sputter deposition, pulsed laser deposition, and evaporative deposition can all be utilized in lieu of cold spray. In other embodiments, an anodization resistant layer of epoxy or plastic can be used to cover the stiffener. Regardless of the manufacturing method, additional components can be added between the enclosure and the deposited layer. For example, cable runs, chip mounts, grounding paths or even antenna windows can be encapsulated along with the stiffener layer.

These and other embodiments are discussed below with reference to FIGS. 1A-6; however, those skilled in the art will readily appreciate that the detailed description given herein with respect to these figures is for explanatory purposes only and should not be construed as limiting.

Figure 1A:
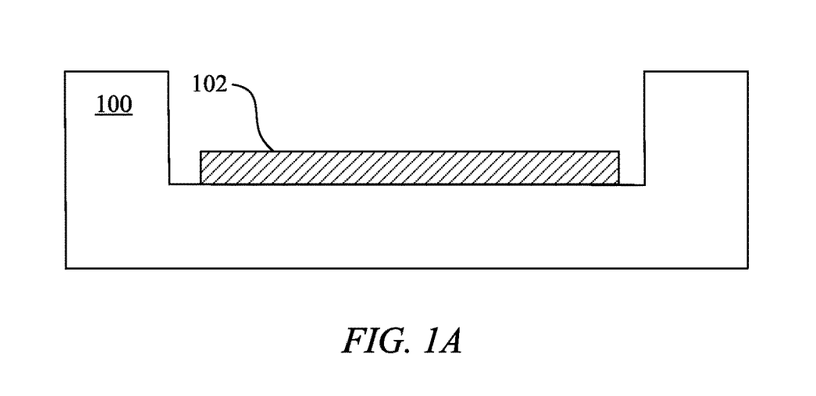
FIGS. 1A-1C show a series of cross-sectional views illustrating a method for embedding a composite material in a metal substrate.
Figure 1B:
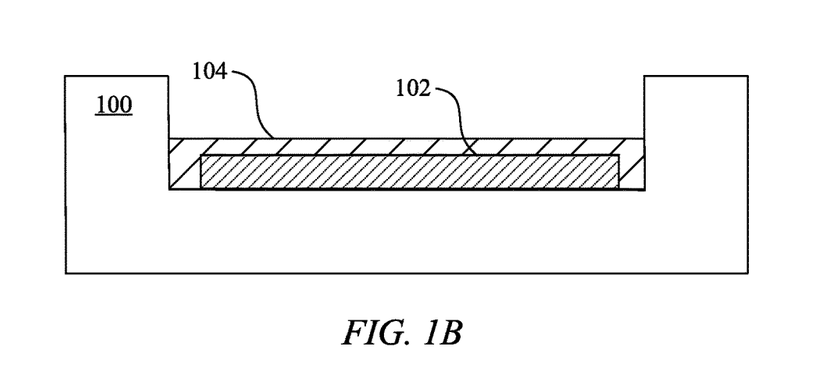
Figure 1C:
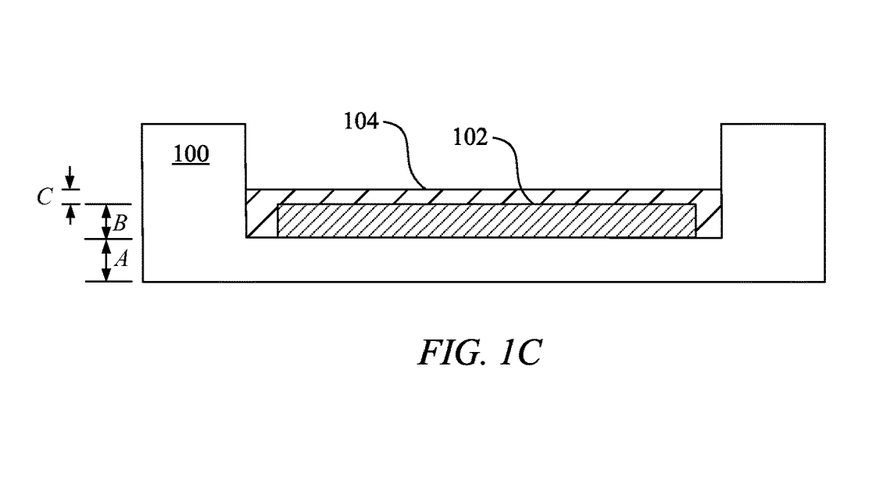

FIGS. 1A-1C show illustrations depicting a process for embedding a stiffener layer within a metal housing of a computing device (e.g., laptop, personal computer, cellular phone, media player, etc.). The stiffener layer can be a composite along the lines of carbon fiber or carbon fiber reinforced plastic and the housing can be formed from an aluminum alloy. It should be noted that these examples are for explanatory purposes only and the described embodiments can be applied to multiple configurations. For example, another composite material such as fiberglass could also be utilized in lieu of carbon fiber or carbon fiber reinforced plastic. FIG. 1A shows a housing 100 having stiffener layer 102 in contact with an inside layer of housing 100. In some embodiments, stiffener layer 102 can be adhesively coupled to housing 100. FIG. 1B shows cold spray layer 104 covering stiffener layer 102. Portions of cold spray layer 104 can adhere to portions of housing 100 with which it is in direct contact. In some cases, cold spray layer 104 can adhere to housing 100 through stiffener layer 102. A temperature, particle size, and velocity of the cold spray deposition method can be adjusted to prevent damage to stiffener layer 102 during deposition of the cold spray. For example, larger particle sizes are less likely to deform, higher temperatures are better for plastic deformation, and high velocities, in some cases, can cause damage to stiffener layer 102. FIG. 1C shows how an outside surface of housing 100 can be machined away, thereby leaving a thin housing wall thickness supported by stiffener layer 102. Stiffener layer 102 can provide increased rigidity and reduced weight for housing 100. Furthermore, stiffener layer 102 can provide increased rigidity to housing 100 allowing housing 100 to be thinned to a thickness that would not otherwise be achievable without the added stiffness introduced by carbon fiber layer 102. In one specific embodiment, the resulting housing can have the following dimensions: a thickness A of housing 100 can be between 0.3-0.4 mm, a thickness B of stiffener layer 102 can be about 0.3-0.4 mm, and a thickness C of cold spray layer 104 can be about 0.1-0.2 mm.

Figure 2A:
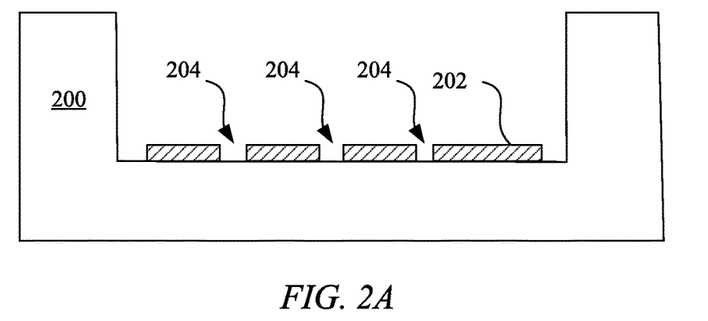
FIGS. 2A-2C show a series of cross-sectional views illustrating an alternative method for embedding a composite material in a metal substrate.
Figure 2B:
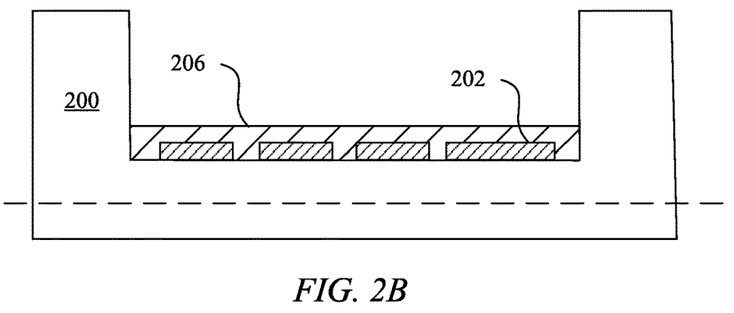
Figure 2C:
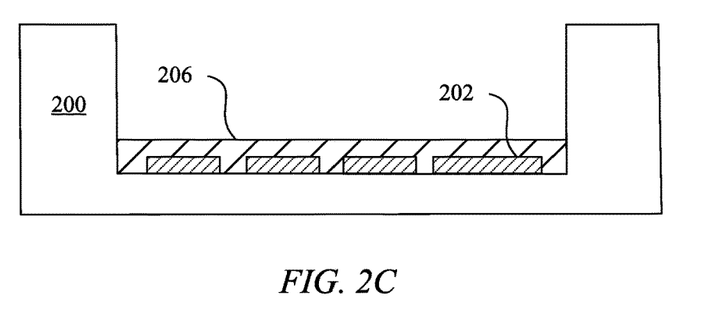

FIGS. 2A-2C show illustrations depicting another process for embedding stiffener layer 202 disposed along an inside surface of housing 200. FIG. 2A shows a stiffener layer 202 disposed along an inside surface of housing 200. Stiffener layer 202 has a number of apertures 204 disposed there through. FIG. 2B shows cold spray layer 206 deposited over stiffener layer 202. Portions of cold spray layer 206 lodged within apertures 204 can enhance adhesion between cold spray layer 206 and housing 200. Furthermore, adverse effects on overall conductivity of housing 200 can be reduced by creating electrically conductive pathways arranged through the portions of the cold spray layer 206 disposed through apertures 204. In some cases, this can increase an effectiveness of chassis ground of housing 200. Electrical components can also be arranged in apertures 204 prior to cold spray layer 206 being deposited, thereby improving the functionality of the housing 200. In some embodiments, cavities or pockets can be created in housing 200 for receiving stiffener layer 202, and subsequently receiving cold spray layer 206.

Figure 3A:
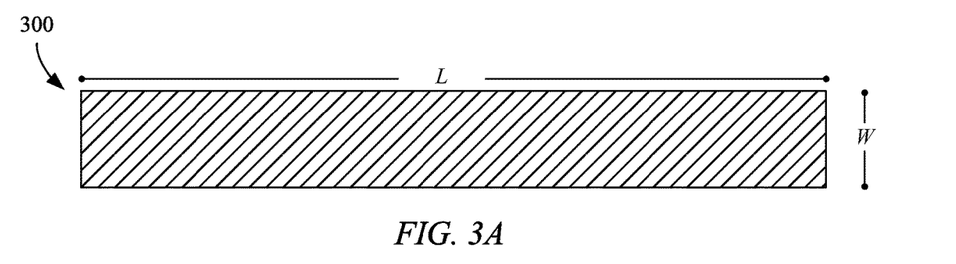
FIGS. 3A-3G show various patterns of a composite layer that can be utilized with the described embodiments.
Figure 3B:
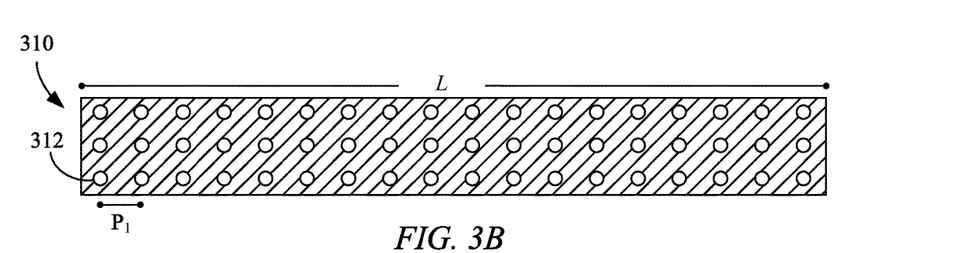
Figure 3C:
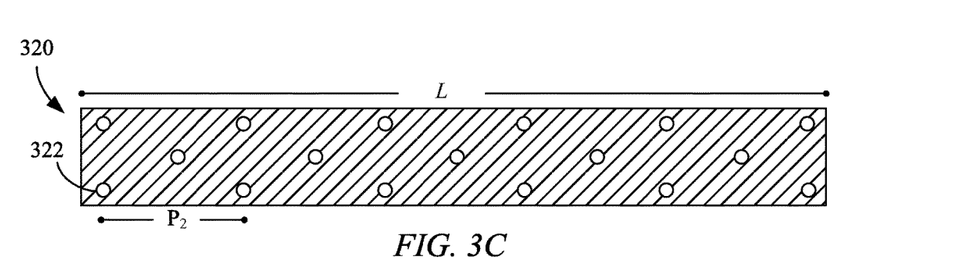
Figure 3D:
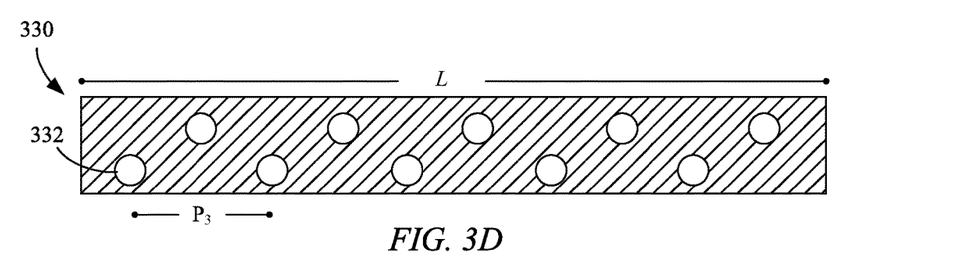
Figure 3E:
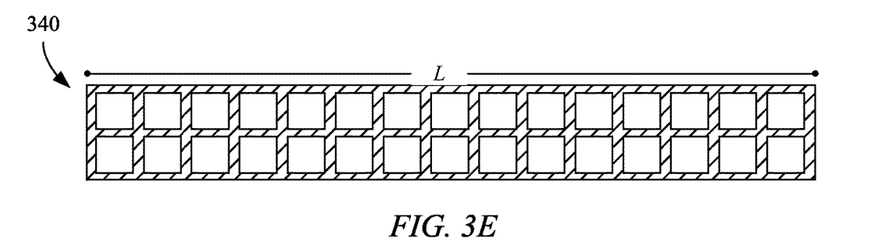
Figure 3F:
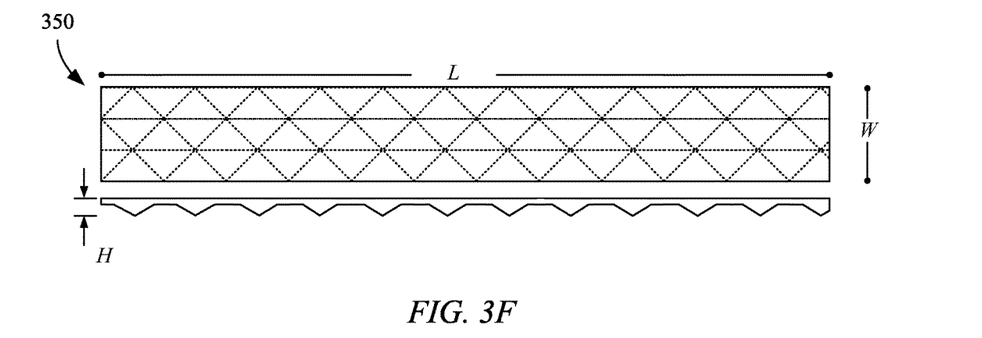
Figure 3G:
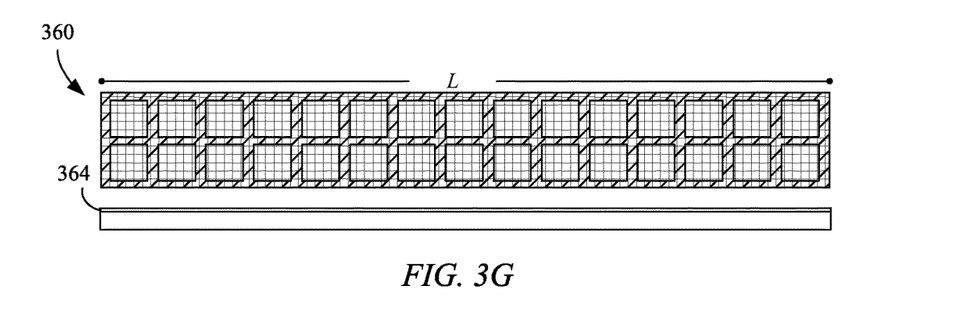

FIGS. 3A-3F show alternate configurations for a stiffener layer suitable for use with the described embodiments. In these configurations, each of the depicted stiffener layers can be a carbon fiber layer having a modulus of elasticity of between about 200-300 GPa. Furthermore, the depicted layers can be constructed from multiple carbon fiber sheets oriented in an isotropic alignment (e.g. 0-45-0). In some embodiments, an overall thickness of the depicted carbon fiber layers can be about 0.3-0.4 mm. FIG. 3A shows a carbon fiber layer 300 without holes having a width W and length L. In some embodiments, W can be about 22 mm while L can be about 152 mm. It should be appreciated that the carbon fiber layers can have greatly varying sizes and shapes depending on a substrate with which they are designed to be used. FIG. 3B shows a carbon fiber layer 310 having a grid of openings. Openings 312 can be arranged in rows at a pitch $P_1$ of about 7.6 mm. Openings 312 can have a diameter of about 2 mm. FIG. 3C shows a carbon fiber layer 320 having openings 322 having a diameter of about 2 mm with a pitch $P_2$ of about 30 mm. FIG. 3D shows a carbon fiber layer 330 having a number of openings 332 with a diameter of about 5 mm and a pitch $P_3$ of about 20 mm. FIG. 3E shows a carbon fiber layer 340 having a number of rectangular openings 342 creating a rib structure. In some embodiments, a size of rectangular openings 342 can be adjusted to tune a stiffness of carbon fiber layer 340. FIG. 3F shows top and side views of carbon fiber layer 350 having a three dimensional geometry with pyramid style embossments. In some embodiments, the three dimensional geometry or the cross section thereof can resemble a sphere, pyramid, semi-circle, rectangle, right angles, sinusoidal plane, exponential plane, and the like. The pyramid style embossments can enhance stiffness of carbon fiber layer 350. The three dimensional geometry of carbon fiber layer 350 can cause a height H of carbon fiber layer 350 to vary. In some embodiments, a maximum height H of carbon fiber layer 350 can be between about 0.3 mm and 0.4 mm. As depicted, a top surface of carbon fiber layer 350 can be substantially planar to allow for bonding of carbon fiber layer 350. FIG. 3G shows top and side views of carbon fiber layer 360 arranged in a grid pattern with a carbon fiber top sheet 364 disposed over a top portion of the layer. In some embodiments, top sheet 364 can be about 0.1 mm thick. Moreover, the shapes and patterns illustrated in FIGS. 3A-3F can be combined or arranged in any suitable configuration for purposes of strengthening a housing while reducing the weight of the housing.

Figure 4A:
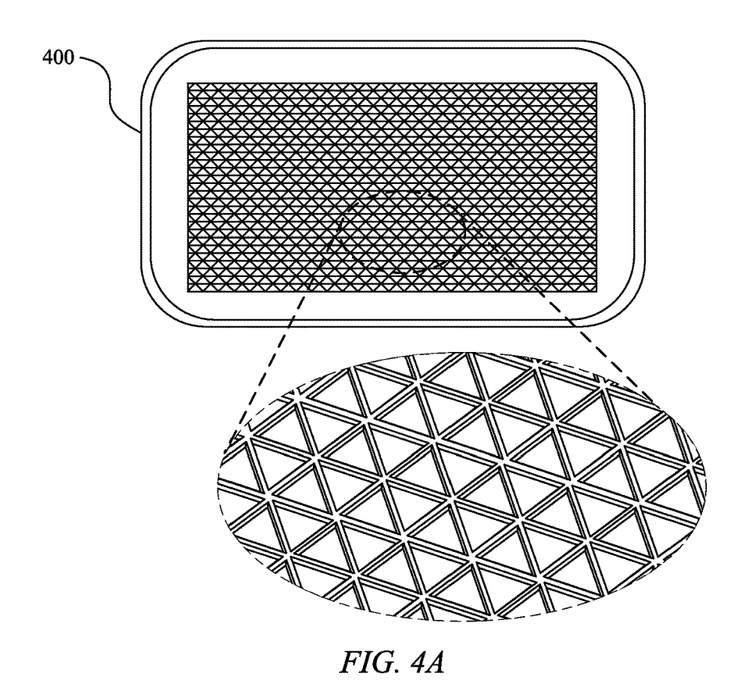
FIGS. 4A-4B show various embodiments for machining a pattern of pockets from an inside surface of the enclosure to reduce weight of an enclosure.
Figure 4B:
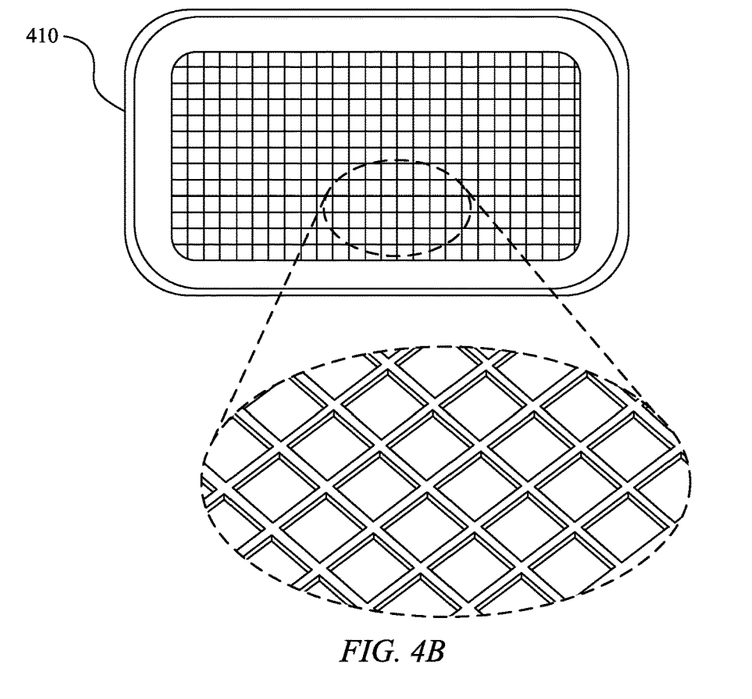
Figure 5A:
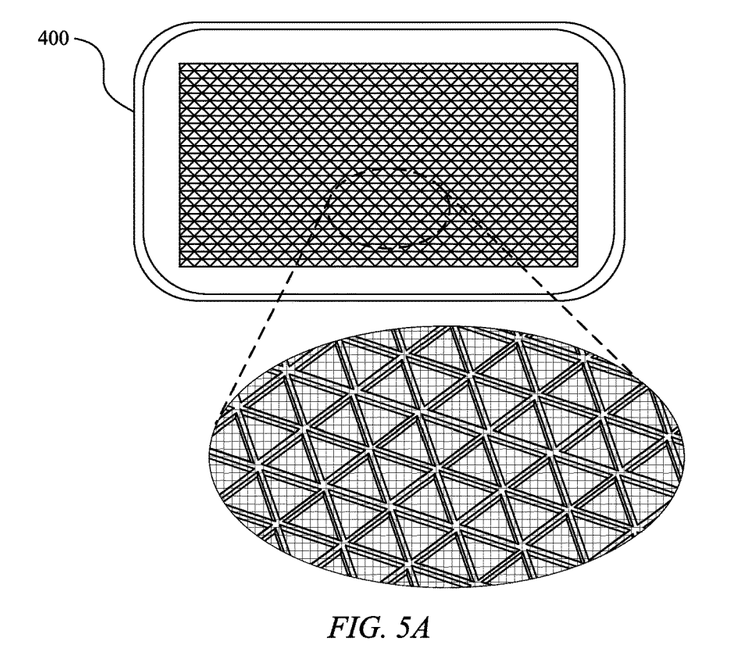
FIGS. 5A-5B show how a composite matrix can be laminated across a number of pockets.
Figure 5B:
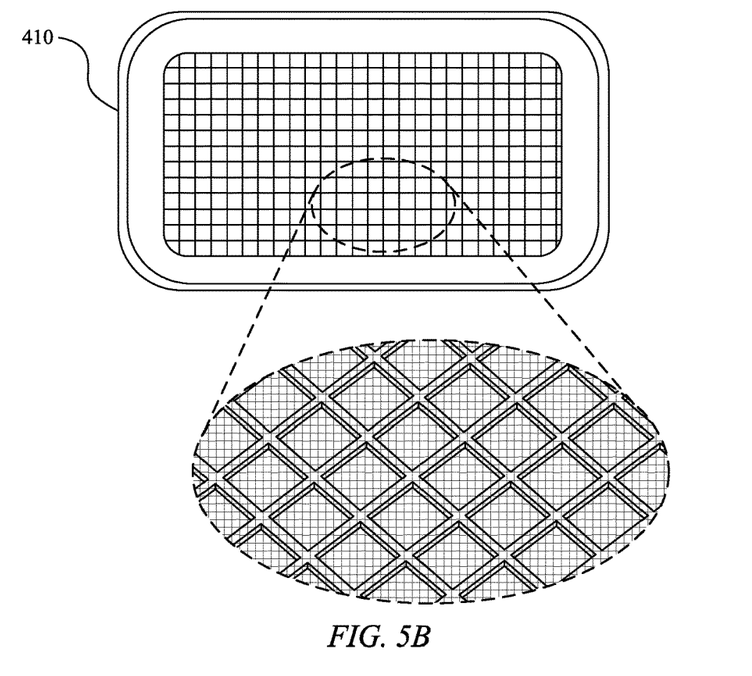

FIG. 4A-4B show various embodiments of housings having a number of pockets machined from an inside surface of the housing. FIG. 4A shows a triangular pattern of pockets etched from an inside surface of housing 400. By etching the triangular pattern, an overall weight of the housing can be reduced while structural integrity of housing 400 can be substantially maintained. FIG. 4B shows a rectangular pattern of pockets etched from housing 410. The rectangular pattern can also be operable to reduce a weight while maintaining structural integrity of housing 410. In other embodiments, a number of circular patterns could be etched in an exemplary housing to achieve a similar weight reduction purpose. In some embodiments, the pattern of pockets can be etched by way of a chemical etching process. FIGS. 5A-5B show another embodiment in which the pocket patterns in FIGS. 4A-4B are overlaid by a stiffener layer. In some embodiments, the stiffener layer can be laminated to an inside surface of the housings, such that it overlays the pockets and improves an overall structural integrity of the housing.

Figure 6:
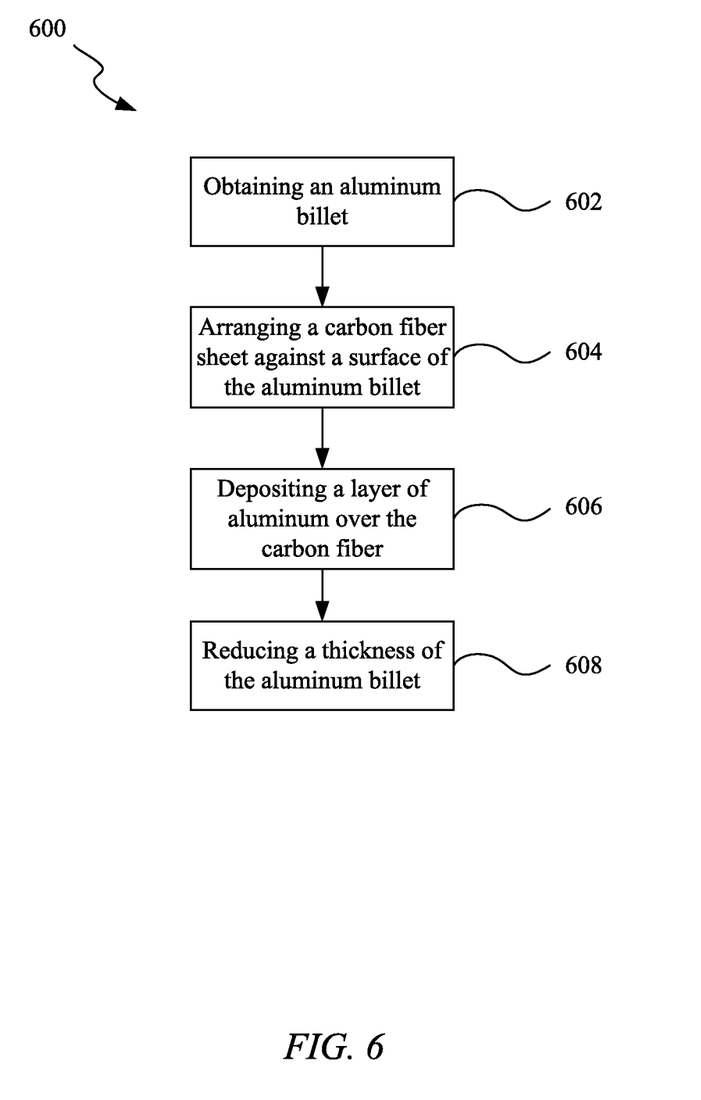
FIG. 6 shows a flow diagram illustrating a method for embedding a composite material within a metal substrate.

FIG. 6 shows a flow chart depicting a method 600 for embedding a stiffener layer in a metal housing (e.g., an aluminum housing). At a first step 602, a billet of aluminum is obtained. The aluminum billet can be formed by an extrusion process. The aluminum can also be produced in other manners such as by rolling, casting, stamping, forging, or electrochemical machining. In step 604, a stiffener layer is arranged against a first surface of the aluminum billet. In some embodiments, the stiffener layer is arranged across an inside surface of the aluminum billet. In some embodiments, the stiffener layer is adhesively coupled to the surface of the aluminum billet. It should be noted that the stiffener layer could have various embodiments. In some implementations, the stiffener layer can be made up of a number of carbon fiber sheets having fibers aligned in various different directions. In other implementations, the stiffener layer can have a pattern of holes disposed there through. The stiffener layer could be made of a number of different materials, such as plastic, or metal (e.g. steel, stainless steel, titanium, etc.). The stiffener layer can also include a hollow or foam layer in some embodiments that reduces an overall density of the stiffener.

In step 606, a layer of aluminum is deposited over the carbon fiber layer, such that the carbon fiber is embedded between the deposited layer of aluminum and the aluminum billet. The aluminum can be deposited by any number of different solid-state deposition methods. In some embodiments, a finishing operation such as buffing, polishing or lapping operations can be applied to the deposited aluminum. The finishing operation can be operable to expose portions of the carbon fiber, or even to allow additional materials to be welded to the encapsulated carbon fiber layer. In step 608, machining aluminum away from a second surface of the aluminum billet can reduce a thickness of the aluminum billet. The second surface of the aluminum billet can be disposed opposite the first surface. The thickness reduction of the aluminum billet can be a portion of a forming process to produce a device housing from the aluminum billet. Inclusion of the stiffener layer within the housing can produce a housing having improved rigidity when compared with an aluminum alloy housing of similar shape and size. It should also be noted that a subsequent anodization process could cause 10-20 microns of an outside surface of the resulting device housing to be converted to an Aluminum Oxide layer. In some embodiments, a portion of the deposited aluminum layer can undergo a finishing process. In some cases, portions of the aluminum can be removed to uncover portions of the stiffener layer. Furthermore, in some cases additional material or components can be welded to the composite layer.

The various aspects, embodiments, implementations or features of the described embodiments can be used separately or in any combination. Software, hardware or a combination of hardware and software can implement various aspects of the described embodiments. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An apparatus, comprising:
    an aluminum substrate having a first surface;
    a stiffener layer comprising carbon fiber abutting the first surface of the aluminum substrate, wherein the stiffener layer includes a plurality of openings; and
    an aluminum layer deposited over the stiffener layer and through the plurality of openings to adhere to and directly contact the aluminum substrate, wherein the aluminum layer and the aluminum substrate encapsulate the stiffener layer.

2. The apparatus of claim 1, wherein the stiffener layer includes a plurality of rows of openings.

3. The apparatus of claim 2, wherein the aluminum layer resides within the openings of each of the plurality of rows of openings.

4. The apparatus of claim 1, wherein a cross-section of the stiffener layer includes pyramidal shapes.

5. The apparatus of claim 1, wherein a thickness of the aluminum substrate at a portion where the stiffener layer abuts the aluminum substrate is thicker than the stiffener layer.

6. The apparatus of claim 1, wherein a cross-section of the stiffener layer includes right angles.

7. The apparatus of claim 1, wherein the first surface comprises at least one pocket or cavity for receiving the stiffener layer and subsequently the aluminum layer.

8. A method for making the apparatus of claim 1, the method comprising:

applying the stiffener layer comprising carbon fiber and including a plurality of openings against the first surface of the aluminum substrate by using an adhesive to bond the stiffener layer to the first surface of the aluminum substrate;

depositing the aluminum layer over the stiffener layer such that the aluminum layer adheres to and directly contact the aluminum substrate through the plurality of openings of the stiffener layer; and machining material away from a second surface of the aluminum substrate that opposes the first surface of the aluminum substrate, wherein the stiffener layer reinforces the second surface of the aluminum substrate during the machining.

9. The method of claim 8, wherein the plurality of openings are filled by the deposited aluminum layer.

10. The method of claim 8, further comprising anodizing the aluminum substrate.

11. The method of claim 8, wherein the stiffener layer has a plurality of rows of openings therethrough.

12. The method of claim 8, further comprising:
arranging additional components adjacent to the stiffener layer for embedding with the stiffener layer.

* * * * *